(12) United States Patent
Piana et al.

(10) Patent No.: US 12,528,389 B2
(45) Date of Patent: Jan. 20, 2026

(54) SYSTEM AND METHOD OF IN-PLACE FUNCTIONALIZATION OF 3D REGIONS AND ARRAYS THEREOF, IN VLAP CUSHIONS, AS INTEGRATED VLAP PRESSURE SENSING CUSHIONS

(71) Applicant: PIANA NONWOVENS, LLC, Cartersville, GA (US)

(72) Inventors: Andrea Piana, Cartersville, GA (US); Michael Stephen DeFranks, Cartersville, GA (US); Nicola Coppede, Parma (IT); Andrea Zappettini, Reggio Emilia (IT); Manuele Bettelli, Reggio Emilia (IT); Marco Villani, Parma (IT)

(73) Assignees: Piana Nonwovens, LLC, Cartersville, GA (US); Consiglio Nazionale Delle Richerche, Rome (IT)

(*) Notice: Subject to any disclaimer, the term of this patent is extended or adjusted under 35 U.S.C. 154(b) by 303 days.

(21) Appl. No.: 18/554,846

(22) PCT Filed: Apr. 15, 2022

(86) PCT No.: PCT/US2022/025029
§ 371 (c)(1),
(2) Date: Oct. 11, 2023

(87) PCT Pub. No.: WO2022/221666
PCT Pub. Date: Oct. 20, 2022

(65) Prior Publication Data
US 2024/0198860 A1 Jun. 20, 2024

Related U.S. Application Data

(60) Provisional application No. 63/175,323, filed on Apr. 15, 2021.

(51) Int. Cl.
B60N 2/00 (2006.01)
B60N 2/70 (2006.01)
(Continued)

(52) U.S. Cl.
CPC ......... *B60N 2/0025* (2023.08); *B60N 2/0033* (2023.08); *B60N 2/7017* (2013.01);
(Continued)

(58) Field of Classification Search
CPC .. B60N 2/0025; B60N 2/0033; B60N 2/7017; B60N 2210/40; B60N 2/0027; A47C 31/10; A47C 31/123
See application file for complete search history.

(56) References Cited

U.S. PATENT DOCUMENTS 10,575,653 B2* 3/2020 DeFranks ............ A47C 21/046
2010/0206863 A1* 8/2010 Ritter .................... D06M 11/83
219/202

(Continued)

FOREIGN PATENT DOCUMENTS

EP 3744206 A1 12/2020

*Primary Examiner* — Freddie Kirkland, III
(74) *Attorney, Agent, or Firm* — WCF IP

(57) ABSTRACT

Methods include functionalizing, into a compressible pressure varying electrical conductance device, a portion of a compressible nonwoven material (CNM) cushion. A process includes forming within a three-dimensional (3D) target region of the CNM cushion a columnar distribution of non-solidified conductive polymer, and converting the columnar distribution of non-solidified conductive polymer into a columnar compressible pressure varying electrical conductance structure. The columnar distribution of non-solidified conductive polymer extends along a column axis. Forming the columnar distribution includes injecting into at least a portion of the 3D target region a liquid carrying conductive polymer in suspension. The columnar compress- (Continued)

ible pressure varying electrical conductance structure includes mutually separated masses of solidified conductive polymer respectively supported by mutually separated flexible fibers of the compressible nonwoven material. Optionally, forming the columnar distribution of non-solidified conductive polymer includes a first injection followed by partial drying, and a second injection.

14 Claims, 11 Drawing Sheets

(51) Int. Cl.
      *A47C 31/10*      (2006.01)
      *A47C 31/12*      (2006.01)

(52) U.S. Cl.
      CPC ............ *A47C 31/10* (2013.01); *A47C 31/123* (2013.01); *B60N 2210/40* (2023.08)

(56) References Cited

U.S. PATENT DOCUMENTS

| | | |
|---|---|---|
| 2013/0004753 A1 | 1/2013 | Majumdar et al. |
| 2015/0000425 A1 | 1/2015 | Miura et al. |

\* cited by examiner 6C-6C

Measurement Current Path

SYSTEM AND METHOD OF IN-PLACE FUNCTIONALIZATION OF 3D REGIONS AND ARRAYS THEREOF, IN VLAP CUSHIONS, AS INTEGRATED VLAP PRESSURE SENSING CUSHIONS

CROSS-REFERENCE TO RELATED APPLICATIONS

This application claims priority to U.S. Provisional Application 63/175,323 filed Apr. 15, 2021, which is hereby incorporated by reference in its entirety.

TECHNICAL FIELD

This invention generally relates to sensors in cushioning devices and, more particularly, to in-place additional functionalization of portions of the devices as sensors.

BACKGROUND

International publication WO 2017/109671 ("the '671 publication"), describes a technique of fully immersing sponge-type materials, e.g., natural sponge, and various artificial sponge materials, in liquid suspensions of conductive polymer, for durations allowing absorption of the liquid to obtain contact with the entire outer surface and inner surfaces of the materials' pores, to an extent obtaining a thorough and uniform coating of the conductive polymer on the outer surfaces and inner pore surfaces, followed by removal of the subject sponge from the immersion, draining of excess liquid, and then applying a thermal process to produce what the '671 publication refers to as a "conductive sponge." The '671 publication's described applications for its conductive sponge include a plantar for reading a human subjects' weight, and seat padding for reading subject's posture, and a moquette directed to detecting presence of objects or people.

However, in various types and kinds of cushioning support apparatuses in which pressure detection functionality may be beneficial, sponge-type materials may not be preferrable for the apparatuses' primary function, i.e., cushioning support. Also, in various types and kinds of cushioning support apparatuses in which pressure detection functionality may be beneficial, a distribution of discrete pressure sensing cushions may be desired. Reasons include, but are not limited to, a more direct measurements of specific pressure profiles and distributions.

SUMMARY

Embodiments can include flexible, in-place functionalized integrated sensors on compressible nonwoven material. For example, the integrated sensors may be pressure sensors, and the compressible nonwoven material can be in a vertically lapped configuration (e.g., VLAP nonwoven material). By functionalized integrated sensors, we mean that portions of the cushioning nonwoven material itself functions as site specific sensors. Applications can include, without limitation, a smart mattress or mattress topper, a seating surface (e.g., automobile chairs, desk chairs, etc.), or any other cushioning article where pressure monitoring is desirable. Features of a VLAP smart mattress can include, without limitation, measurement and display of pressure distribution, pressure points, which can be utilized to improve, for example, posture and sleep quality. Features of a seating surface sensor in automobiles may also be related to posture and comfort sensing.

Features of processes in accordance with one or more embodiments include direct functionalization with conductive polymers and flexible materials of the nonwoven (e.g., VLAP). The integrated pressure sensors may be arranged into a sensor array to determine the pressure distribution of a flexible, stretchable, conformable sleep surface or seating surface with, for example, a focus on identification of pressure points and their impact on comfort, utility, and sleep quality.

The active area of the sensor in the nonwoven (e.g., VLAP) structure and the electrical contacts on the surface of or inside the nonwoven, must maintain a flexible structure, preserving the breathability of the structure and defining a matrix able to recognize the pressure in each point of a defined area. Embodiments include a single sensor or a matrix of sensing spots. A dedicated electronic device can read the pressure in the different points of the matrix and software for the data collection and visualization may be utilized. The sensor system may be tested for response, sensitivity, and stability. The system duration in time may be measured in simulated and real use conditions.

An example of disclosed methods according to various embodiments includes functionalizing a portion of a compressible nonwoven material (CNM) cushion (e.g., cushion constructed of at least some nonwoven layers, preferably VLAP layers) as a pressure varying electrical conductance (PVEC) cushion device. Example operations can include forming within a three-dimensional (3D) target region of the CNM cushion a columnar distribution of non-solidified conductive polymer. The columnar distribution can extend along a column axis normal to a front surface and a back surface of the CNM cushion. The columnar distribution can include a first end and a second end spaced apart by a height, in a direction toward the front surface, from the first end. The first end can be on or at the same level as the back surface and the second end can be on, or at the same level as the front surface. Forming the columnar distribution can include injecting into at least a portion of the 3D target region a liquid carrying conductive polymer in suspension. Operations can further include converting the columnar distribution of non-solidified conductive polymer into a columnar compressible pressure varying electrical conductance structure extending from the column first end to the column second end, comprising mutually separated masses of solidified conductive polymer respectively supported by mutually separated flexible fibers of the compressible nonwoven material. The converting can include a drying and/or curing of the distribution of non-solidified conductive polymer.

This Summary identifies example features and aspects and is not an exclusive or exhaustive description of disclosed subject matter. Whether features or aspects are included in or omitted from this Summary is not intended as indicative of relative importance of such features or aspects. Additional features are described, explicitly and implicitly, as will be understood by persons of skill in the pertinent arts upon reading the following detailed description and viewing the drawings, which form a part thereof.

DETAILED DESCRIPTION

Figure 1A:
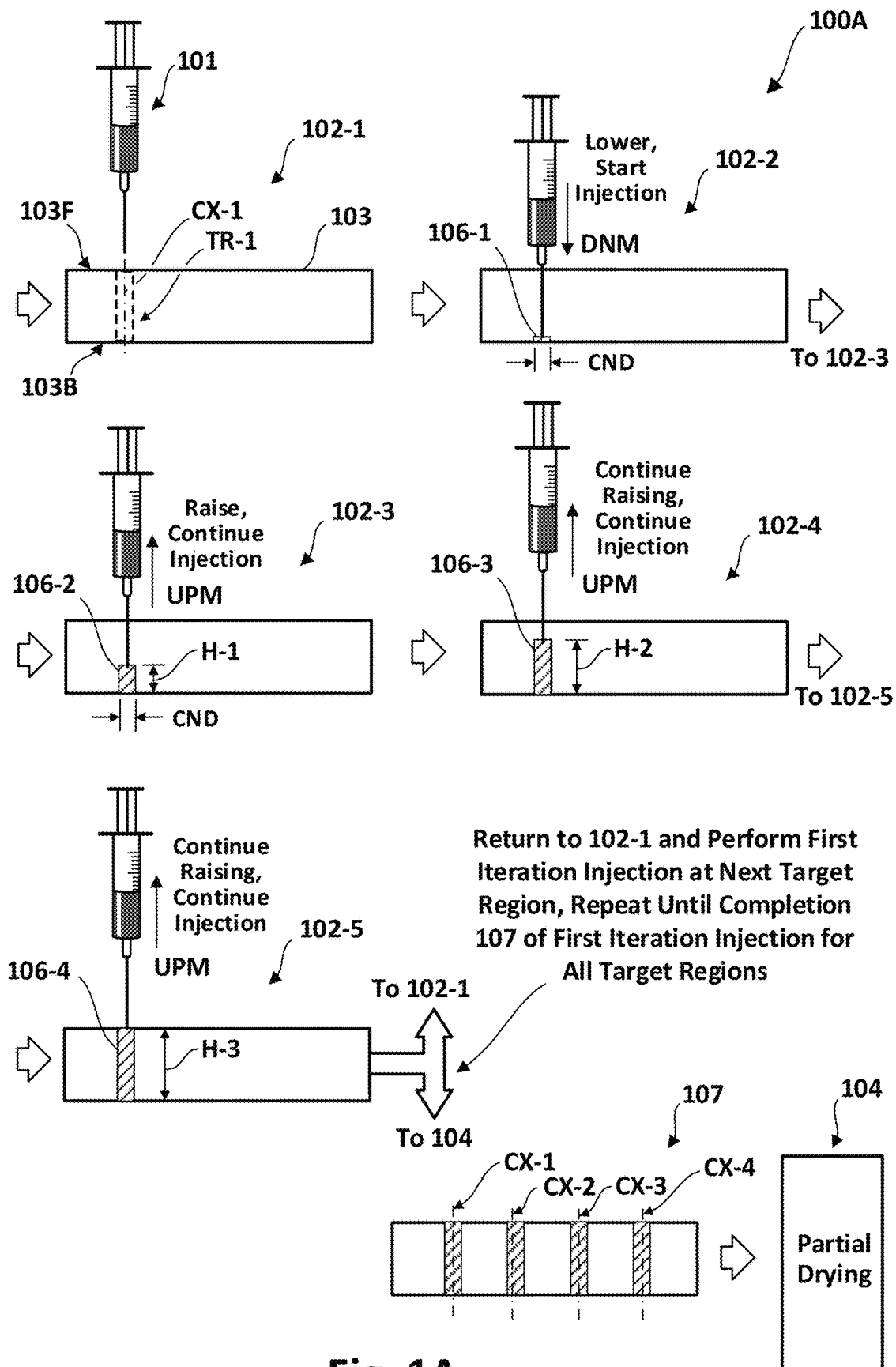
FIG. 1A is a process diagram illustrating an example first iteration injection, and example partial drying fixing of a first iteration columnar distribution of non-solidified conductive polymer, according to an embodiment.

In an embodiment, an in-place functionalization process can be applied to a 3D target region of a compressible nonwoven material (CNM) cushion, e.g., and without limitation a CNM mattress or seating cushion or toppers therefore, which can provide in the 3D target region an in-place functionalized CNM pressure-varying electrical conductance device. The in-place functionalization process, according to one or more embodiments, can form the in-place instantiated CNM pressure-varying electrical conductance device as a columnar shaped device. The columnar shape can be, for example, a cylindrical shape, a rectangular box shape, or other suitable shape. Operations in the in-place functionalization process according to various embodiments can be configured to form columnar shaped CNM pressure-varying electrical conductance devices, e.g., cylindrical shaped devices, to extend along a column axis that can extend normal to a front surface and a back surface of the CNM cushion.

For brevity, subsequent recitation herein of "pressure-varying electrical conductance" will use the coined letter sequence "PVEC." It will be understood that as used herein "PVEC" has no intrinsic meaning. It will be understood that "PVEC" as used herein is a reduced letter count representation of the word sequence "pressure varying electrical conductance," no more, no less In various embodiments, the CNM can be a vertically lapped ("VLAP") nonwoven material which can be formed, for example, with methods described in U.S. Publication 2008/0155787 and U.S. Pat. No. 7,591,049, each of which is incorporated herein by reference. VLAP nonwovens are commercially available from various commercial vendors. Features of in-place functionalization processes in accordance with one or more embodiments can include, but are not limited to, forming the devices with mutual alignment of the column axes and the VLAP fiber orientation, with one another and normal to the front and back surfaces of the VLAP cushion.

In-place functionalizing processes according to various embodiments can include a sub-process of forming within the 3D target region of the VLAP cushion a columnar distribution of non-solidified conductive polymer, and can include a sub-process of converting the columnar distribution of non-solidified conductive polymer into a columnar shaped in-place instantiated VLAP PVEC device. The converting process in accordance with one or more embodiments can comprise a drying or curing of the distribution of non-solidified conductive polymer through, for example, the application of heat or radiant energy.

According to various embodiments, operations and materials in the sub-process of forming within the VLAP cushion the columnar distribution of non-solidified conductive polymer and operations in the sub-process of converting the distribution can be mutually configured to form the columnar shaped in-place functionalized VLAP PVEC device with particular structural features. In one or more embodiments, these structural features can include mutually separated portions or collections of solidified conductive polymer, respectively supported by mutually separated flexible fibers of the VLAP. By aspects and operations described in more detail in later sections of this disclosure, these structural features, in combination, provide characteristics of the pressure-varying electrical conductance of the columnar shaped in-place functionalized VLAP PVEC cushion device.

In an embodiment, the forming the columnar distribution of non-solidified conductive polymer can comprise an injecting process, which can include injecting into at least a portion of the 3D target region a liquid carrying conductive polymer in suspension. Examples can include, but are not limited to, poly(3.4-ethylenedioxythiophene) polystyrene sulfonate (PEDOT:PSS), poly (6-(thiophene-3-yl) hexan-1-sulfonate (PTHS), polyaniline, polypyrrole, polythiophene and polyfuran, each of which are available from various commercial vendors. Aqueous solutions carrying PEDOT: PSS, can be used, such as CLEVIOS™ PH 1000, CLEVIOS™ F 010, CLEVIOS™ F ET available from Heracus GmbH.

In an embodiment, injecting operations in the sub-process of forming within the VLAP cushion the columnar distribution of non-solidified conductive polymer, can be further configured to form the columnar distribution to have a first end, coincident with or adjacent to the back surface of the VLAP cushion and a second end that can be coincident with or adjacent to the front surface of the VLAP cushion.

In an embodiment, operations in forming the distribution of non-solidified conductive polymer can include compressing the VLAP occupying the 3D target region into a compressed-state VLAP that occupies a portion of the 3D target region, and injecting into the compressed state VLAP the liquid carrying conductive polymer in suspension. In the embodiment, operations in the sub-process of forming the distribution of non-solidified conductive polymer can also include providing expansion of the compressed-state VLAP out to the 3D target region. The expansion can be configured, according to the embodiment, to distribute within and among fibers of the VLAP within the 3D target region, as the columnar distribution, at least a portion of the liquid solution carrying the conductive polymer.

In one or more embodiments, operations of the sub-process of forming the distribution of non-solidified conductive polymer and in the converting can be mutually configured as a multi-step iterative process. According to one or more embodiments, operations in the multi-step iterative process can include injecting a first iteration portion of the liquid carrying conductive polymer in suspension, to form a first columnar distribution of the liquid carrying conductive polymer in suspension. The first iteration injection can be followed by a first iteration drying or curing, which can be configured to physically fix, against unwanted flow dissipation, distributed conductive polymer.

According to one or more embodiments, further operations in the multi-step iterative process can include injecting a second iteration portion of the liquid carrying conductive polymer in suspension. The second iteration injecting can be at the same injection site, i.e., aligned to the same columnar axis. According to one or more embodiments, after the second iteration injecting, the entire in-process VLAP cushion can be fully dried. Example operations for fully drying include, but are not limited to, an extended duration at room temperature (rT), e.g., without limitation, 12-24 hours. The first iteration injection can be followed by a first iteration drying, which can be configured to physically fix, against unwanted flow dissipation, distributed conductive polymer.

Figure 1B:
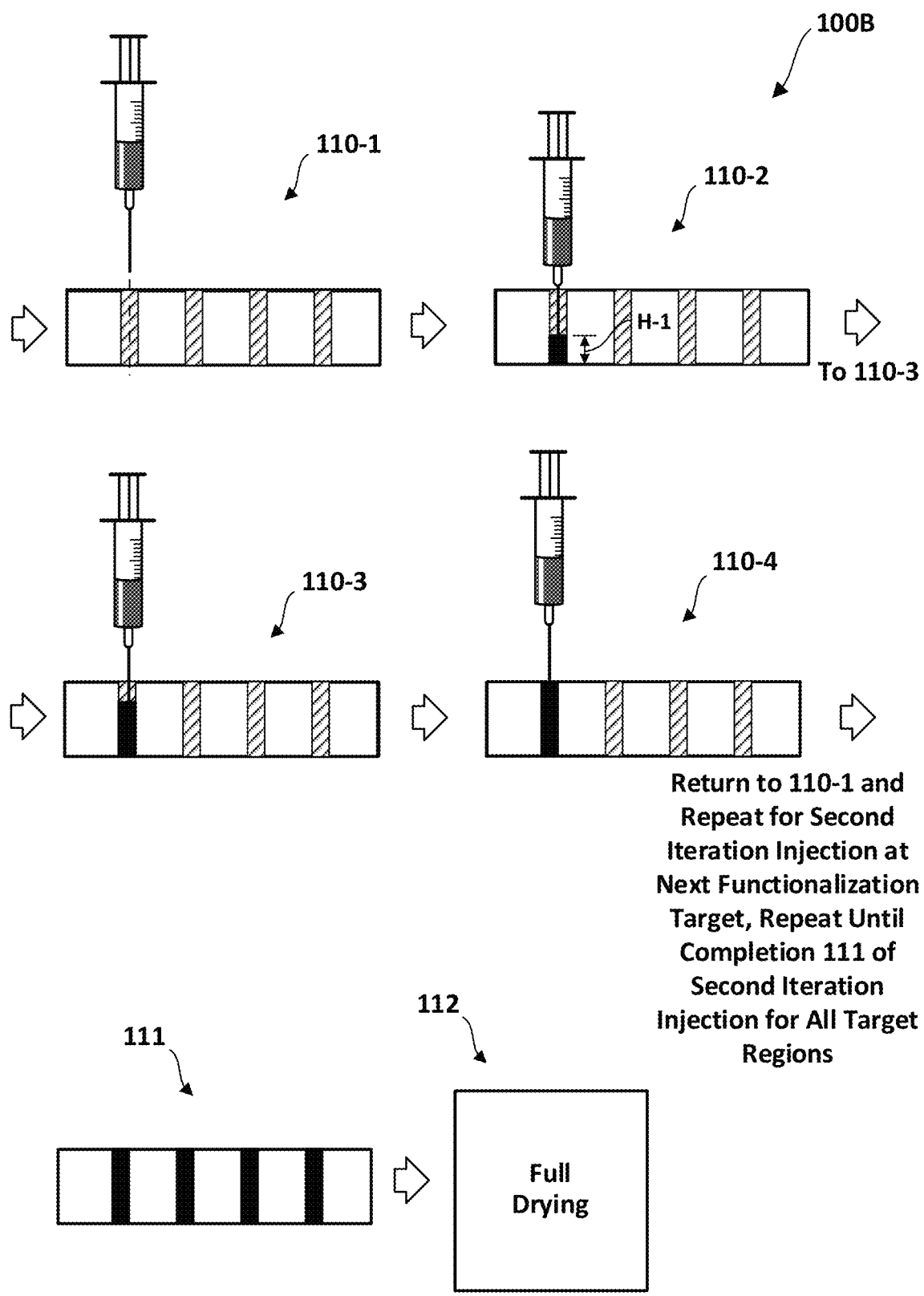
FIG. 1B shows an example second iteration injection for homogenizing a columnar distribution of non-solidified conductive polymer, and a final drying, in an example iterative process for forming a columnar in-place functionalized VLAP PVEC cushion device in accordance with various embodiments.

Processes according to one or more embodiments include functionalizing an array of columnar in-place functionalized VLAP PVEC cushion devices, at an array of 3D target regions. In such processes, the first iteration injection can be performed for all the 3D target regions, followed by partial drying to fix the array of first distributions, followed by second iteration injection for all the target regions, followed by complete drying of the entire VLAP cushion, resulting in a VLAP cushion with an array of columnar, in-place functionalized VLAP PVEC cushion devices Example 1—Multi-Iteration Injection Functionalization Process According to One or More Embodiments FIGS. 1A and 1B show, in combination, a process flow diagram for an example of a multi-iteration injection in-place functionalization process in accordance with one or more embodiments, which can functionalize a plurality, e.g., an array of 3D target regions of a VLAP cushions, into a corresponding plurality, e.g., array of columnar in-place functionalized VLAP PVEC cushion devices according to various embodiments. The example multi-iteration injection in-place functionalization process that can be performed in accordance with FIGS. 1A and 1B is a two-iteration implementation, comprising a first iteration injection sub-process with a partial drying that forms a plurality or array of in-progress columnar distributions of not fully dried conducting polymer, which can be performed, for example, via process flow in accordance with FIG. 1A, and a second iteration injection sub-process, followed by a full drying that results in the array of columnar in-place functionalized VLAP PVEC cushion devices, which can be performed, for example, via process flow in accordance with FIG. 1B.

The FIG. 1A diagram, labeled and referenced herein as first iteration process diagram 100A, shows an example first iteration injection sub-process flow via sequence of snapshots, 102-1, 102-2, 102-3, 102-4, and 102-5 (collectively "first iteration injection snapshots 102"). Each of the first iteration snapshots 102 shows a respective position of, and a current movement direction of, an example injection nozzle 101. Each of the first iteration snapshots 102 also shows a snapshot state of the first iteration distribution. Non-limiting example parameters, e.g., first iteration injection volume, are described in more detail later in this disclosure. Operations in a first iteration process in accordance with first iteration process diagram 100A can fix the in-progress columnar distributions conductive polymer, in an arrangement wherein a substantial portion is coated on VLAP fibers. This can be followed by, for example, applying a partial drying 104. Non-limiting example parameters for the partial drying 104 are described in more detail in later paragraphs.

The FIG. 1A depiction of an abstracted drawing of a medical syringe as its graphic representation of the injection nozzle 101 is not intended as any limitation, or as any indication or statement of preference as to structure or other specifications regarding implementation of the injection nozzle 101. Example implementation of the injection nozzle, for practiced in accordance with various embodiments, can include, but are not limited to, industrial injection nozzles, supported, for example, by a robotic arm providing controlled translational 3D movement in an X-Y-Z reference system, and certain rotation about one or more rotational axes.

The FIG. 1B diagram, labeled and referenced herein as process diagram 100B, shows an example second iteration injection sub-process flow via another sequence of injection nozzle positions, which can but do not necessarily use the same injection nozzle 101 used for the first iteration injection sub-process. The FIG. 1B process diagram 100B shows its example second iteration injection sub-process flow via another sequence of snapshots, 110-1, 110-2, 110-3, 110-4, and 110-5 (collectively "second iteration injection snapshots 110"). As described for the first iteration injection snapshots 102, each of the second iteration injection snapshots 110 shows a respective position of and current movement direction of the example injection nozzle 101, and shows a snapshot state of the second iteration distribution. Non-limiting example parameters, e.g., second iteration injection volume, are described in more detail later in this disclosure. Operations in a second iteration process in accordance with second iteration process diagram 100B can apply a completion drying to can fix the in-progress columnar distributions, for example, by applying a partial drying or curing 104. Non-limiting example parameters for the partial drying or curing 104 are described in more detail in later paragraphs.

For purposes of describing example operations in reference to FIGS. 1A and 1B, the front surface 103F of an example VLAP cushion 103 is referenced as "above" the back surface 103B, and "height" is assumed, except where explicitly stated as being otherwise, and/or in contexts where it is made clear to be otherwise, as a distance above the back surface 103B.

Referring to FIG. 1A, an example instance of a first iteration injection process can begin at a state shown by first iteration injection first snapshot 102-1, which can space the tip of injection nozzle 101 spaced above the front surface 103F of the VLAP cushion 103, and aligned with a first columnar axis CX-1 of a first columnar target region TR-1 within the VLAP cushion 103, extending from a TR-1 column back end (visible but not separately numbered) on the back surface 103R up to a TR-1 column front end (visible but not separately numbered) on the front surface 103F.

The example instance of the first iteration injection process can then proceed to process state shown by first iteration injection snapshot 102-2, lower the tip of injection nozzle 101, by the downward movement labeled "DNM" to an injection starting height. The injection starting height can be, for example, coincident with the back surface 103B. Operations in the example first instance of the first iteration injection can then commence first iteration injection of the liquid, e.g., water borne solution of conductive polymers. In an embodiment, concurrent with or upon a delay after commencing the first iteration injection the, the injection muzzle 102 can start an upward movement, along the first columnar axis CX-1, In an embodiment, process operations can begin at state 102-1, with the tip of injection nozzle 101 spaced above the front surface 103F of the VLAP cushion 103, and aligned with a first columnar axis CX-1 of a first columnar target region TR-1.

Figure 2A:
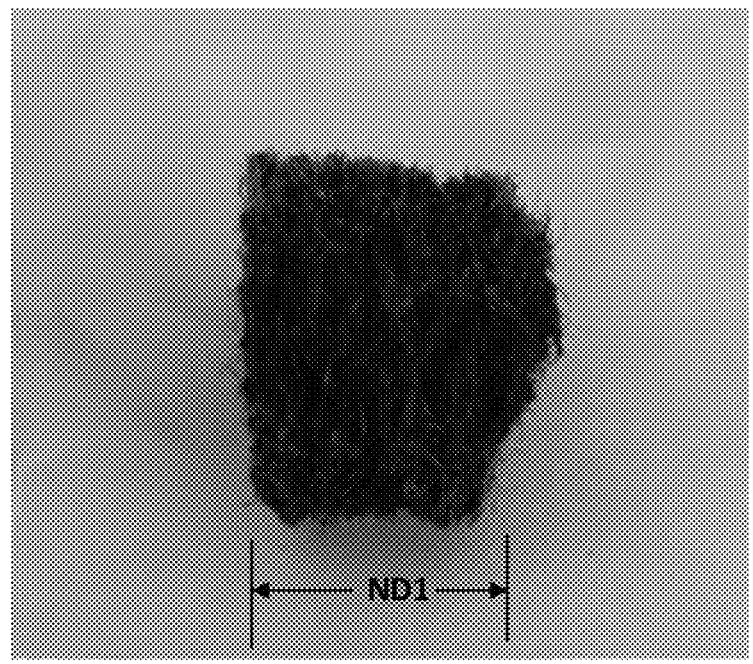
FIG. 2A shows a perspective view photo image of a columnar in-place functionalized VLAP PVEC cushion device, cut from a VLAP cushion after formation.

FIG. 2A shows a perspective view photo image of a columnar in-place functionalized VLAP PVEC cushion device, cut from a VLAP cushion after formation.

Figure 2B:
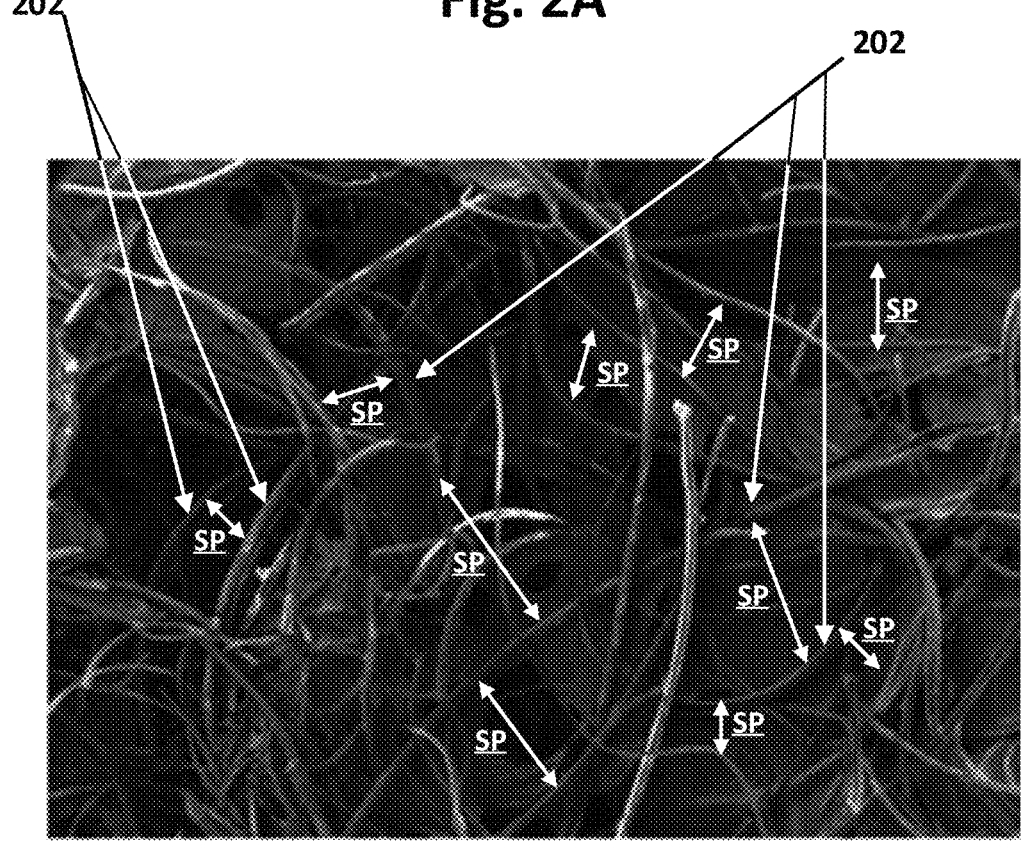
FIG. 2B shows a scanning electron microscope (SEM) image of a region of the FIG. 2A structure.

FIG. 2B shows a scanning electron microscope (SEM) image of a region of the FIG. 2A structure. Referring to FIG. 2B, in a feature of functionalization processes such as described in reference to FIGS. 1A and 1B, drying of the distribution of non-solidified conductive polymer can obtain a columnar structure that changes its conductivity by collapsing the empty spaces in the material and increasing the connection points between the conductive film on the fibers. Examples of solidified conductive polymer coated VLAP fibers are labeled "202." Example spacings are labeled "SP." As can be seen from FIG. 2B, as lower pressures are applied the smaller spacings SP come into contact with one another to increase the conductivity from the top to the bottom of the column. Then, as more pressure is applied, the larger spacings SP come into contact with one another to increase the conductivity even more. In this way, the pressure at the region of a column within the VLAP PVEC cushion device can be readily detected and measured, and changes in pressure at that region can be monitored over time.

Figure 3:
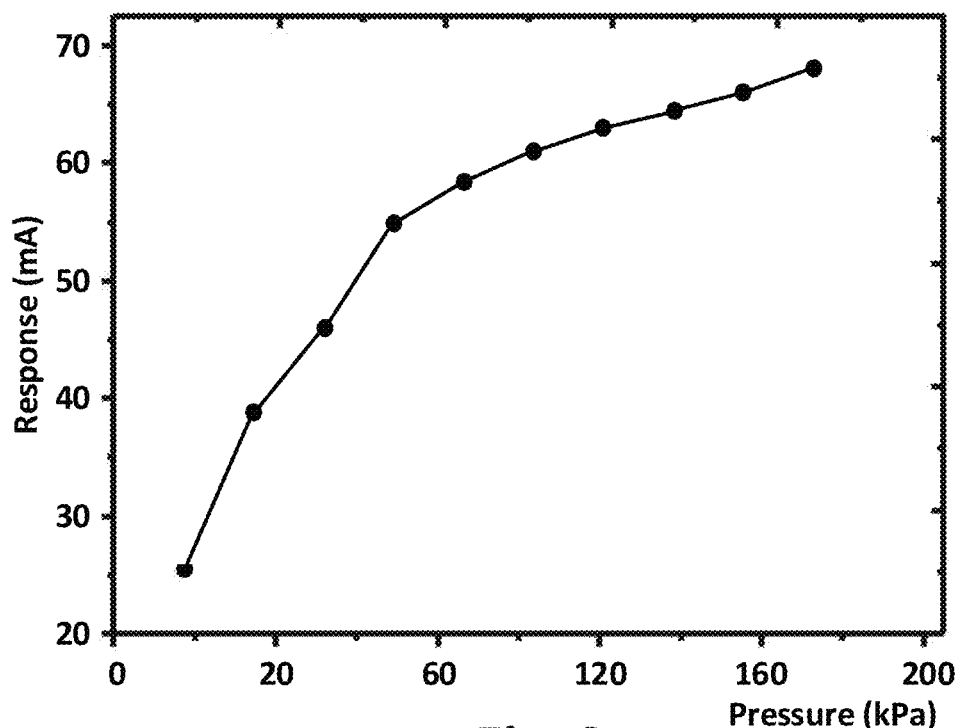
FIG. 3 is a pressure versus current graph of measurements of an example columnar in-place functionalized VLAP PVEC cushion device according to an embodiment.

FIG. 3 is a pressure (kPa) versus current (mA) response graph of measurements of electrical current passing through an example columnar in-place functionalized VLAP PVEC cushion device, formed by in-place functionalization processes according to one or more embodiments described herein.

Figure 4:
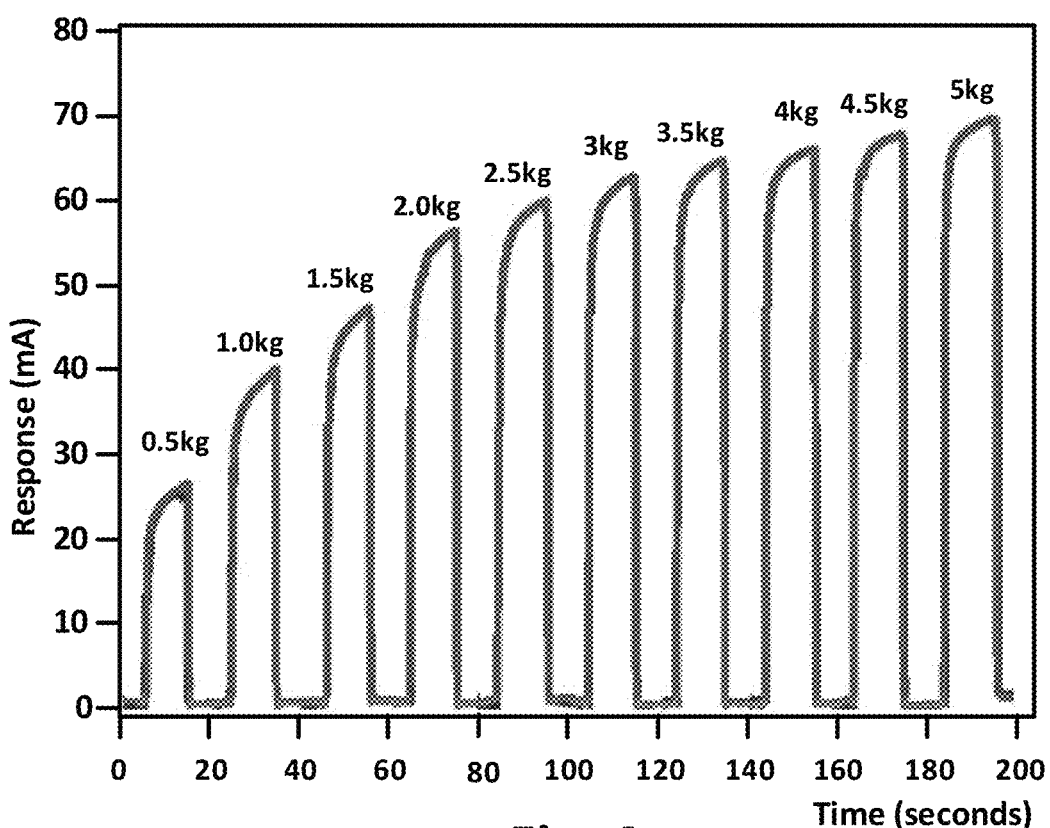
FIG. 4 is a time versus current graph of measurements of conductance response time of one example columnar in-place functionalized VLAP PVEC cushion device, formed by a process according to one or more embodiments.

FIG. 4 is a time (seconds) versus current response (mA) graph of measurements of conductance response time of one example columnar in-place functionalized VLAP PVEC cushion device, formed by a process according to one or more embodiments described herein.

Figure 5A:
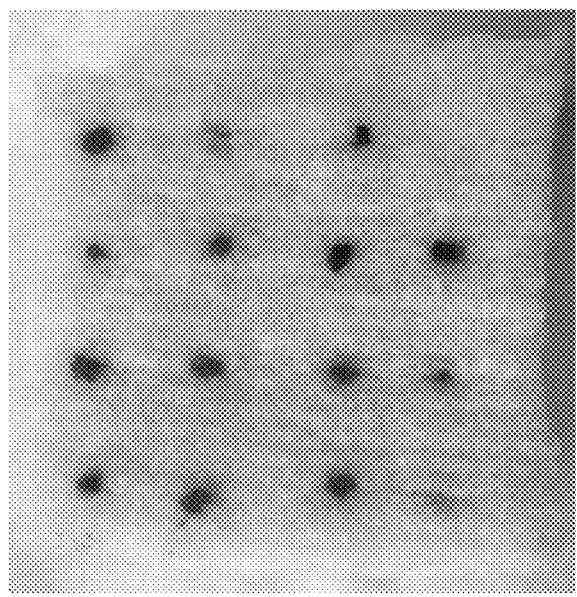
FIGS. 5A, 5B, and 5C show, respectively, photo-images of a front surface visible surface structure, a back surface visible surface structure, and a cross-cut side surface visible surface structure of an example 4×4 array of columnar in-place functionalized VLAP PVEC cushion devices formed with processes in accordance with one or more embodiments.
Figure 5B:
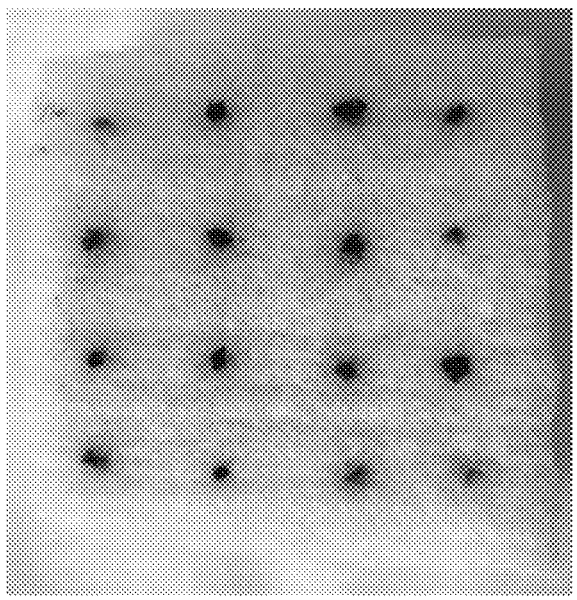
Figure 5C:
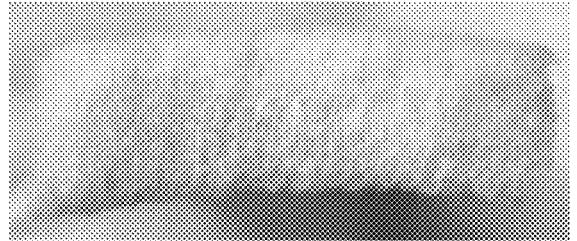

FIGS. 5A, 5B, and 5C show, respectively, photo-images of a front surface visible surface structure, a back surface visible surface structure, and a cross-cut side surface visible surface structure of an example 4×4 array of columnar in-place functionalized VLAP PVEC cushion devices formed with processes in accordance with one or more embodiments. The surface structures on the front and back surfaces, i.e., the top and bottom of the columns of the columnar in-place functionalized VLAP PVEC cushion device provide for a location of electrical contact with the columns, while the remainder of the VLAP PVEC cushion device can provide, in some applications, electrical insulation between each of the columns.

Figure 6A:
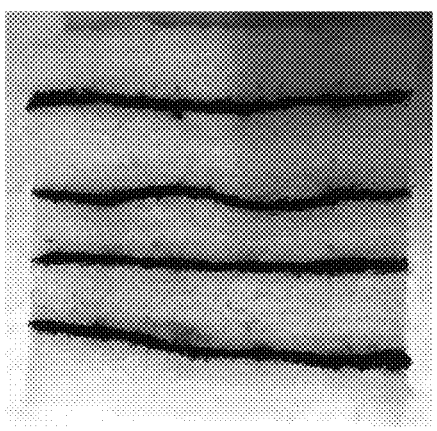
FIG. 6A shows a photo-image of an example implementation of front surface visible structure for front surface supported, printed conductive ink "row" connection elements for a 4×4 array of columnar in-place functionalized VLAP CVEC cushion devices.
Figure 6B:
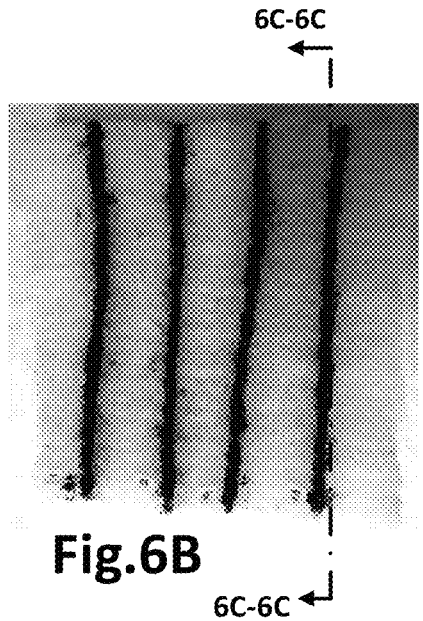
FIG. 6B shows a photo-image of an example implementation of back surface visible structure for four back surface supported, printed conductive ink "column" connection elements for the FIG. 2A 4×4 array.
Figure 6C:
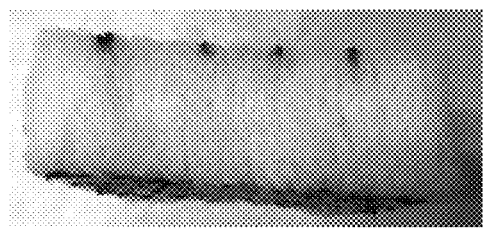
FIG. 6C shows a side view on FIG. 6B cross-cut projection plane 6C-6C.

FIG. 6A shows a photo-image of an example implementation of front surface visible structure for front surface supported, printed conductive ink "row" connection elements for a 4×4 array of columnar in-place functionalized VLAP CVEC cushion devices; FIG. 6B shows a photo-image of an example implementation of back surface visible structure for four back surface supported, printed conductive ink "column" connection elements for the FIG. 2A 4×4 array; and FIG. 6C shows a side view on FIG. 6B cross-cut projection plane 6C-6C. When reviewing FIGS. 5A-C and FIGS. 6A-C, it can be discerned that each column of the 4×4 array has its top in contact with one of the ink rows on the top of the VLAP CVEC cushion device and its bottom in contact with one of the ink rows on the bottom of the VLAP CVEC cushion device. This allows the conductivity of each specific column to be measured and monitored.

Example 2—Pressure Monitoring System VLAP Mattress with Integrated Columnar In-Place Functionalized Pressure Sensing Cushions In an embodiment, a system can include a VLAP mattress with an array of in-place functionalized VLAP CVEC cushion devices, with a communicatively connected to the row coupling and column coupling elements, with logic for monitoring the conductance therefore the pressure profile, exerted on the VLAP CVEC cushion devices, and for interfacing with user, e.g., a touchscreen display.

Figure 7:
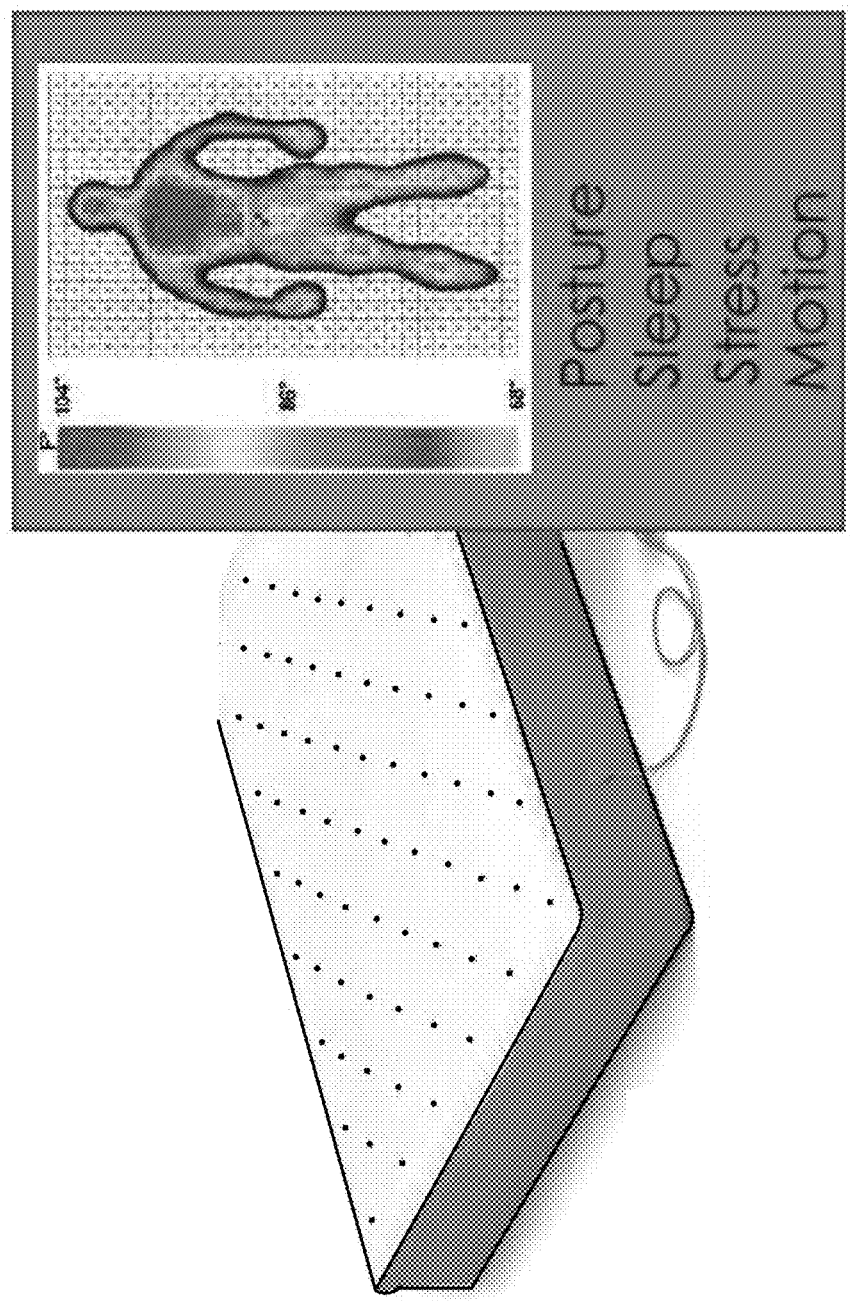
FIG. 7 shows a system diagram of a pressure monitoring system in according with one or more embodiments, including an example VLAP CNM mattress featuring a row-column array of in-place functionalized VLAP CVEC cushion devices, coupled via an analog-to-digital (A/D) interface to a processor featuring row-column decoding conductance measurement logic, conductance measurement to pressure conversion, and a user display to visualize pressure patterns.

FIG. 7 shows a system diagram of a pressure monitoring system in according with one or more embodiments, including an example VLAP CNM mattress featuring a row-column array of in-place functionalized VLAP CVEC cushion devices, coupled via an analog-to-digital (A/D) interface to a processor featuring row-column decoding conductance measurement logic, conductance measurement to pressure conversion, and a user display to visualize pressure patterns.

Figure 8:
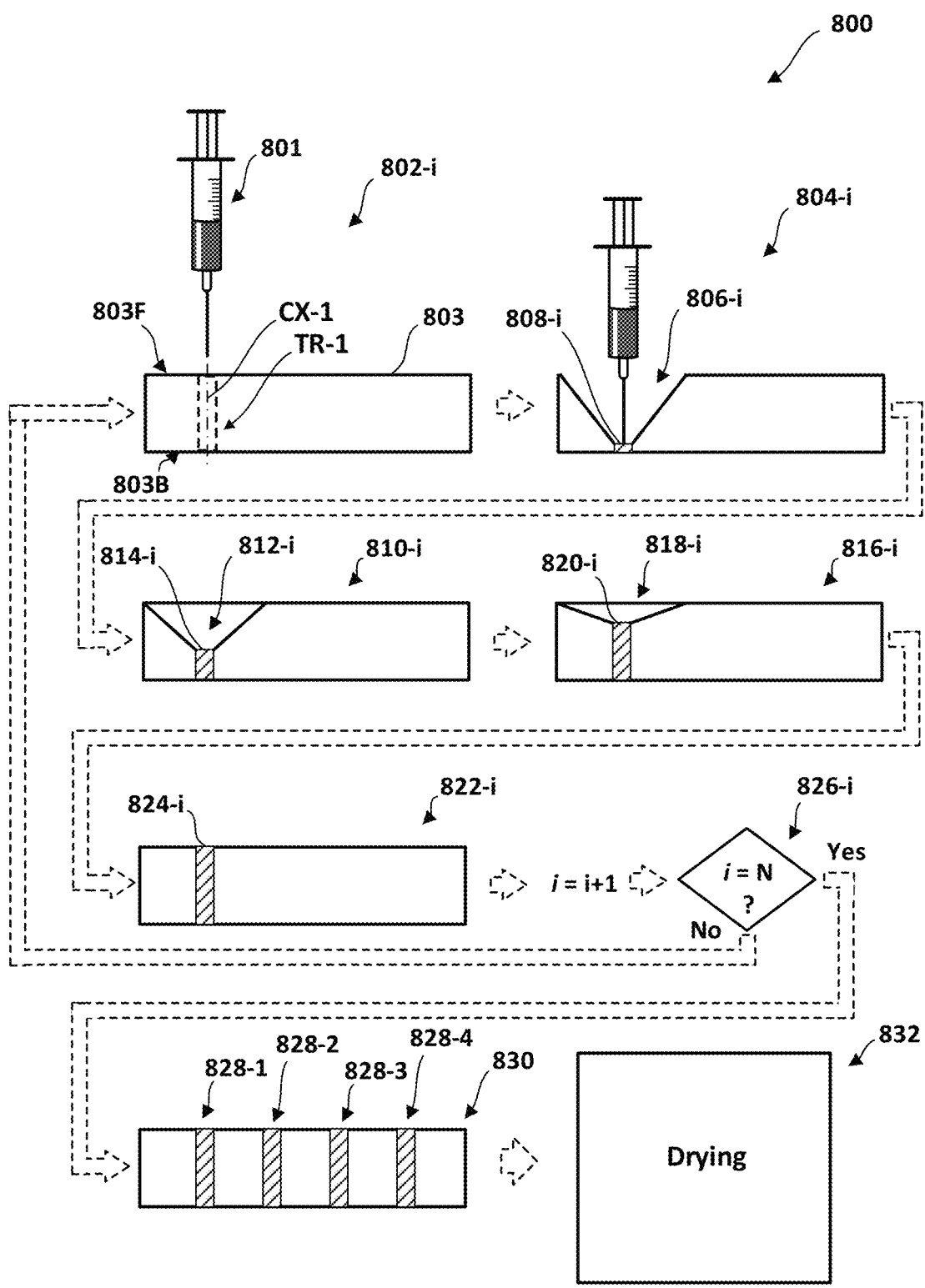
FIG. 8 is a process diagram illustrating example operations in an example local compression, inject, and release single-pass process according to one or more embodiments, for providing in-place functionalization of selectable regions of a VLAP cushion into in-place functionalized VLAP CVEC cushion devices.

Example 3—Single Iteration In-Place Functionalization Process According to One or More Embodiments FIG. 8 is a process flow diagram 800 illustrating operational features and flow in one example implementation of a one-iteration in place functionalization process according to various embodiments. Features include, but are not limited to, a single iteration forming columnar distribution in one of, or in each of an array or other plurality of columnar 3D target regions of a VLAP cushion. According to various embodiments, operations in one iteration can include, at each columnar 3D target region, localized compression of the VLAP material into a portion of the target region, e.g., a lower portion at the back surface, injection of liquid suspension of conductive polymer into the compressed portion, and release for self-expansion back to the original columnal target region. According to various embodiments, the compression and injection can be mutually configured such that the self-expansion back to the columnal target region shape and dimension draws the liquid suspension of conductive polymer up from, or out from the portion of the target region, to distribute throughout the full columnal target region.

Operations in a process in accordance with the flow diagram 800 can start at physical process state 802. FIG. 8 numbers the physical process state 802 as "802-$i$" the distribution operations starting at 802-$i$ and continuing to physical process sate 816-$i$ are repeated for each functionalization instance, i.e., for each target region. FIG. 8 shows an example of 4 instances, as seen in physical process state 830.

Each of the 4 instances produces another columnar distribution, shown on FIG. 8 as first columnar distribution 828-1, second columnar distribution 828-2, third columnar distribution 828-3, and fourth columnar distribution 828-4 (collectively referenced as "columnar distributions 828"). In an embodiment, each of the columnar distributions 828 can extend from a column bottom end or first end on a back or bottom surface of the subject VLAP cushion, upward to a column top or second end on a front or top surface of the VLAP cushion.

Proceeding from the starting process state 802-$i$, an example process can apply downward pressure on the front or top surface of the VLAP cushion, preferably localized within the perimeter of the first target region TR-1. In an embodiment, the downward pressure can form, as shown in process state snapshot 804-$i$ a depression 806-$i$, in turn compressing the VLAP originally in the first target region TR-1 into a reduced portion 808-$i$, proximal to the back or bottom surface. Operations can then inject, into the compressed VLAP 808-$i$, the liquid suspension of the conductive polymer, as shown in physical state 804-$i$. In an embodiment, the total volume of the liquid suspension can be injected into the compressed VLAP in the reduced portion 808-$i$. The injection nozzle 801, and then the compressive force applicator (not separately visible in FIG. 8) can be removed. Removal of the force applicator allows the compressed VLAP to self-expand back, in part due to the resiliency characteristic of the VLAP, to its original form.

The self-actuating expansion can be progressive, and can effectuate a progressive raising of the injected liquid suspension. Physical process state 810-$i$ shows an example snapshot, as a lessened depression 812-$i$, surrounding an increased height columnar distribution 814-$i$. Physical process state 816-$i$ shows a later state in the continuing expansion, exhibiting a further lessened depression 818-$i$, surrounding a further increased height columnar distribution 820-$i$. The self-actuating expansion ca continue, until termination or sufficient termination. as shown in physical process state 822-$i$, in which the height of the columnar distribution 824-$i$ is the height of the VLAP cushion.

For purposes of description, the process flow diagram 800 shows a logic incrementation by integer 1 of the loop index $i$, followed by an $i^{th}$ instance of a condition switched branch logic 826-$i$. In the FIG. 8 example, if the incremented index is not equal to "N." in this instance N being 4, the flow can return to the starting state 802-$i$, and repeat the above-described compress-inject-release operations, except with the injector nozzle 801 aligned with second columnar axis CX-2, then repeat again, in alignment with the third columnar axis CX-3, and finally in alignment with fourth columnar axis CX-4.

After the compress-inject-release operations forming the fourth columnar distribution 828-4, the answer to the condition inquiry at 826-4 will be "Yes." In an embodiment operations in the process can then proceed to the drying 832, which can convert the four columnar distributions 828 into an array or collection of four columnar in-place functionalized VLAP PVEC cushion devices.

Figure 9A:
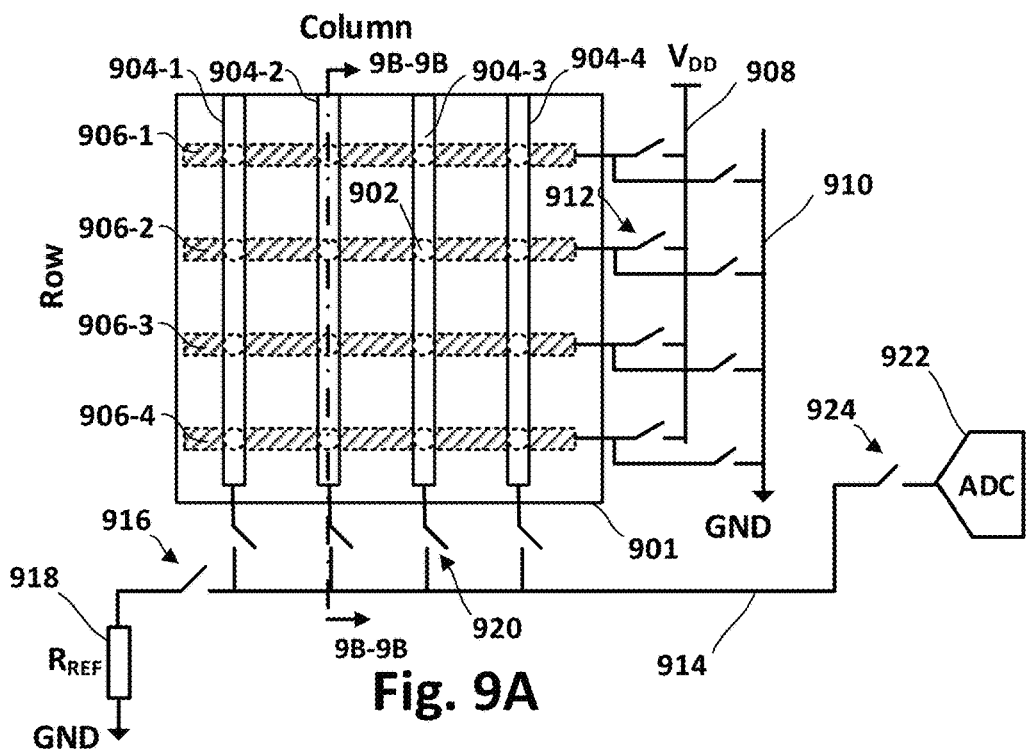
FIG. 9A shows a top projection of an example arrangement of an integrated pressure sensing VLAP cushion in accordance with various embodiments, including a 4×4 array of in-place functionalized VLAP CVEC cushion devices, top surface row connector and bottom surface column connectors coupled to an example 4×4 row-column conductance measurement circuit.
Figure 9B:
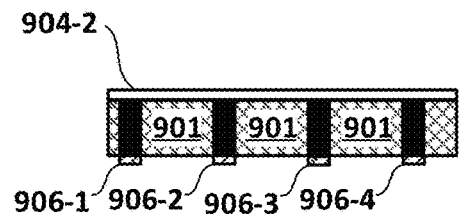
FIG. 9B shows an example structural arrangement of the FIG. 9A 4×4 array, viewed from FIG. 9A cross-cut projection 9B-9B.

Example 4—Pressure Monitoring System, with Array Distribution of Columnal Integrated VLAP CVEC Cushioning Devices, Coupled to a Multiplexing, Conductance Based Pressure Monitor FIG. 9A shows a front projection view of an example implementation of an integrated pressure sensing VLAP cushion in accordance with various embodiments. FIG. 9B shows a crosscut projection view, on FIG. 9A crosscut projection plane 9B-9B. The FIG. 9A example comprises a 4-row by 4-column, i.e., 4×4 array of in-place functionalized columnar VLAP CVEC cushion devices, visible on FIG. 9A as integer 16 hidden line circles. The hidden line circle representation of one of the in-place functionalized VLAP CVEC cushion numbered as item number "902." Later paragraphs include, in reference to FIG. 9C, description of an example measuring of conductance of the in-place functionalized VLAP CVEC cushion devices, and uses device 902 as the illustrative example.

Referring to FIG. 9A, the example includes a population of 4 front surface arranged column coupling elements, respectively numbered 904-1, 904-2, 904-3, and 904-4, and 4 back surface arranged row coupling elements, respectively numbered 906-1, 906-2, 906-3, and 906-4. The 4×4 row-column count and corresponding population of 16 in-place functionalized columnar VLAP CVEC cushion devices are for purposes of clearer visibility of certain features, and are not intended as any indication of preference, or limitation of the scope of practices in accordance with disclosed embodiments.

For brevity and convenience of description, generic reference and collective reference to column coupling elements 904-1, 904-2, 904-3, and 904-4 will be alternatively recited as "a column coupling element 904," and "column coupling elements 904." respectively. In like manner, generic reference and collective reference to row coupling elements 906-1, 906-2, 906-3, and 906-4 will be alternatively recited as "a row coupling element 906." and "row coupling elements 906," respectively.

The FIG. 9A-9B example also includes a row "VDD" power rail 908 and a corresponding row "ground" (GND) rail 910. Each of the 4 row coupling elements 906 is provided an individual row-specific VDD coupling switch, for switchable coupling to the row "VDD" power rail 908. All four of the individual row-specific VDD coupling switches are visible on FIG. 9A. For purposes of later description of measuring the conductance of the in-place functionalized VLAP CVEC cushion devices, each is numbered as "912." For purposes of such description of the measurement, the row coupling element 906-2 having the row-specific switchable VDD coupling switch 912 will be alternatively referenced as the "second row coupling element 906-2." Each of the row coupling elements 906 is also provided a row-specific GND coupling switch to the row GND rail 910, all of which are visible on FIG. 9A but not separately numbered.

The FIG. 9A-9B example also includes a column reference rail 914 that is switchably connected, via column reference coupling switch 916, to a reference resistor 918 that connects to GND. Each of the 4 column coupling elements 904 is provided an individual column-specific reference rail coupling switch, for switchable coupling to the column reference rail 914. All 4 of the column-specific reference rail coupling switches are visible on FIG. 9A. One is numbered "920" for convenience in later description in reference to FIG. 9C of the example conductance measurement of the in-place functionalized VLAP CVEC cushion device 902.

Referring to FIG. 9A, in accordance with one or more embodiments, the example can also include an analog-to-digital converter (ADC) 922, which can be switchably coupled to the column reference line 914, via ADC coupling switch 924.

Figure 9C:
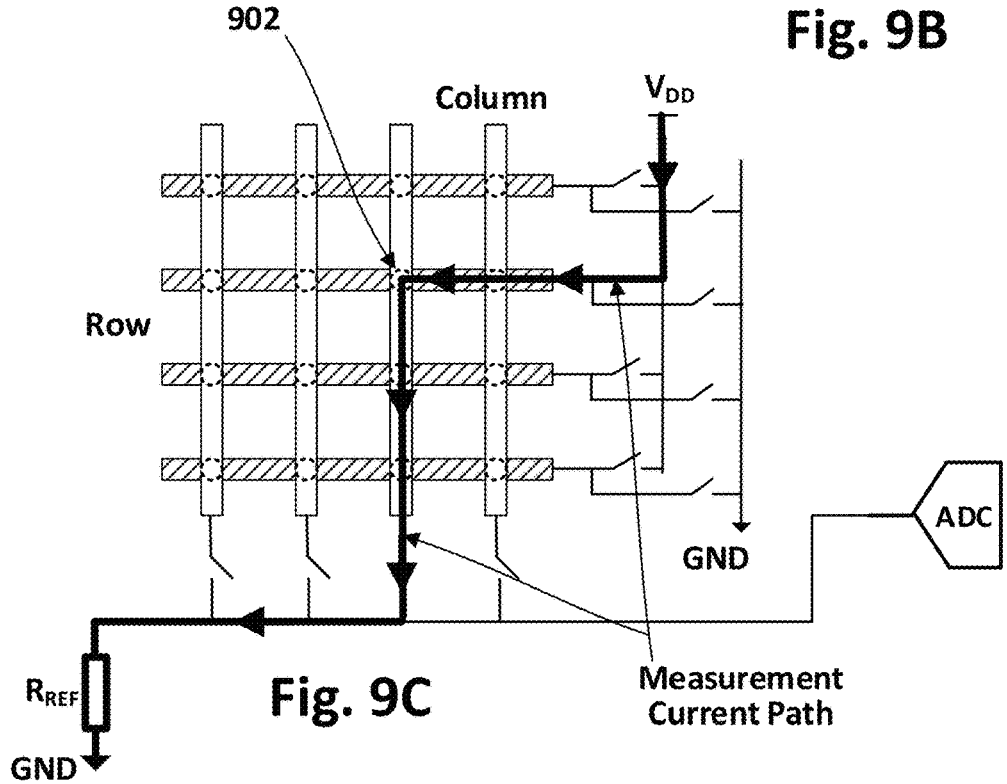

Referring to FIG. 9C, operations in an example instance of measuring the conductance of the in-place functionalized columnar VLAP CVEC cushion device 902 will now be described. Persons of ordinary skill in the art (POSITAs) will understand, from FIG. 9C, general operations of the four individual row-specific VDD coupling switches, the 4 row-specific GND coupling switches, the four individual column-specific reference rail coupling switches, the column reference rail 914, the column reference coupling switch 916, the ADC 922, and ADC coupling switch 924, and will be able to readily understand, sufficiently to practice measurement of any other among the 16 in-place functionalized VLAP CVEC cushions in accordance with disclosed embodiments.

According to various embodiments, operations in measuring the conductance of in-place functionalized columnar VLAP CVEC cushion device 902 include connecting, by switching ON the row-specific VDD coupling switch 912, the second row coupling element 906-2 to the row VDD power rail 908. This couples VDD to the front end of the in-place functionalized columnar VLAP CVEC cushion device 902, e.g., the end of the columnar VLAP CVEC cushion device 902 that is on the front surface of the VLAP cushion 901. Operations for this example also include connecting the second column coupling element 904-2 to the column reference rail 914, by switching ON the second column-specific reference rail coupling switch 920. Operations for this example also include connecting the column reference rail 914 to the reference resistor 918, by switching ON column reference coupling switch 916, and connecting the ADC 922 to the column reference rail 914, by switching ON the ADC coupling switch 924.

For purposes of description the end of the in-place functionalized columnar VLAP CVEC cushion device 902 that connects directly to the second row coupling element 906-2 will referenced as the "first end." and the end that connects directly to the second column coupling element 904-2 will be referenced as the "second end."

The above-described operations establish a measurement current path, which FIG. 9C shows as a graphic path diagram that is superposed on FIG. 9A. The graphic path diagram is explicitly labeled on FIG. 9C, and includes a first segment that is from the row VDD power rail 908 to the first end of the in-place functionalized columnar VLAP CVEC cushion device 902, aa second segment that is from the first end to the second end of the in-place functionalized columnar VLAP CVEC cushion device 902, and a third segment that is from the second end of the in-place functionalized columnar VLAP CVEC cushion device 902 to the non-grounded end of the reference resistor 918, then through the reference resistor 908, and then to GND. The magnitude of the current carried by the measurement current path is fully determined by the specific present numerical value of the voltage VDD, the present conductance (i.e., inverse of resistance) of the functionalized columnar VLAP CVEC cushion device 902 summed with the present resistance of the first segment and the present resistance of the second segment.

The arrangement described in FIGS. 9A-C can be practiced with larger arrays the 4×4, arrays that do not have the same number of columns and rows, or any other configuration. The important feature is that in-place functionalized columnar VLAP CVEC cushion device 902 has an array of instantiated conductive columns, each of which can be separately and or simultaneously sensed, depending on the desired application.

Figure 10:
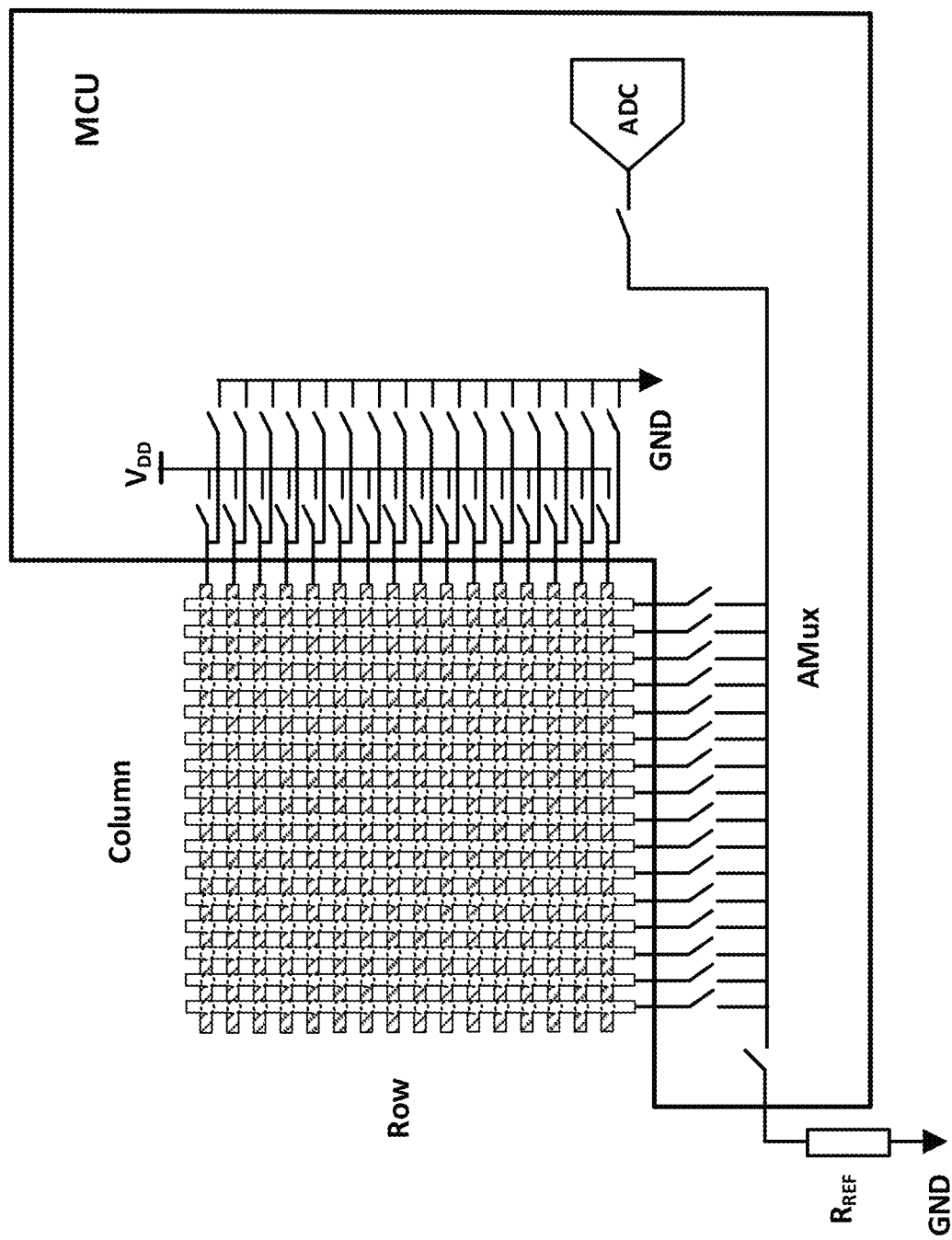
FIG. 10 shows a top projection view of an example arrangement of an integrated, in-place functionalized pressure sensing VLA cushion in accordance with various embodiments, including a 16×16 array of columnar in-place functionalized VLAP CVEC cushion devices, top surface row connector and bottom surface column connectors coupled to an example 16×16 row-column conductance measurement circuit.

FIG. 10 shows a top projection view of an example arrangement of an integrated, in-place functionalized pressure sensing VLA cushion in accordance with various embodiments, including a 16×16 array of columnar in-place functionalized VLAP CVEC cushion devices, top surface row connector and bottom surface column connectors coupled to an example 16×16 row-column conductance measurement circuit.

Figure 11:
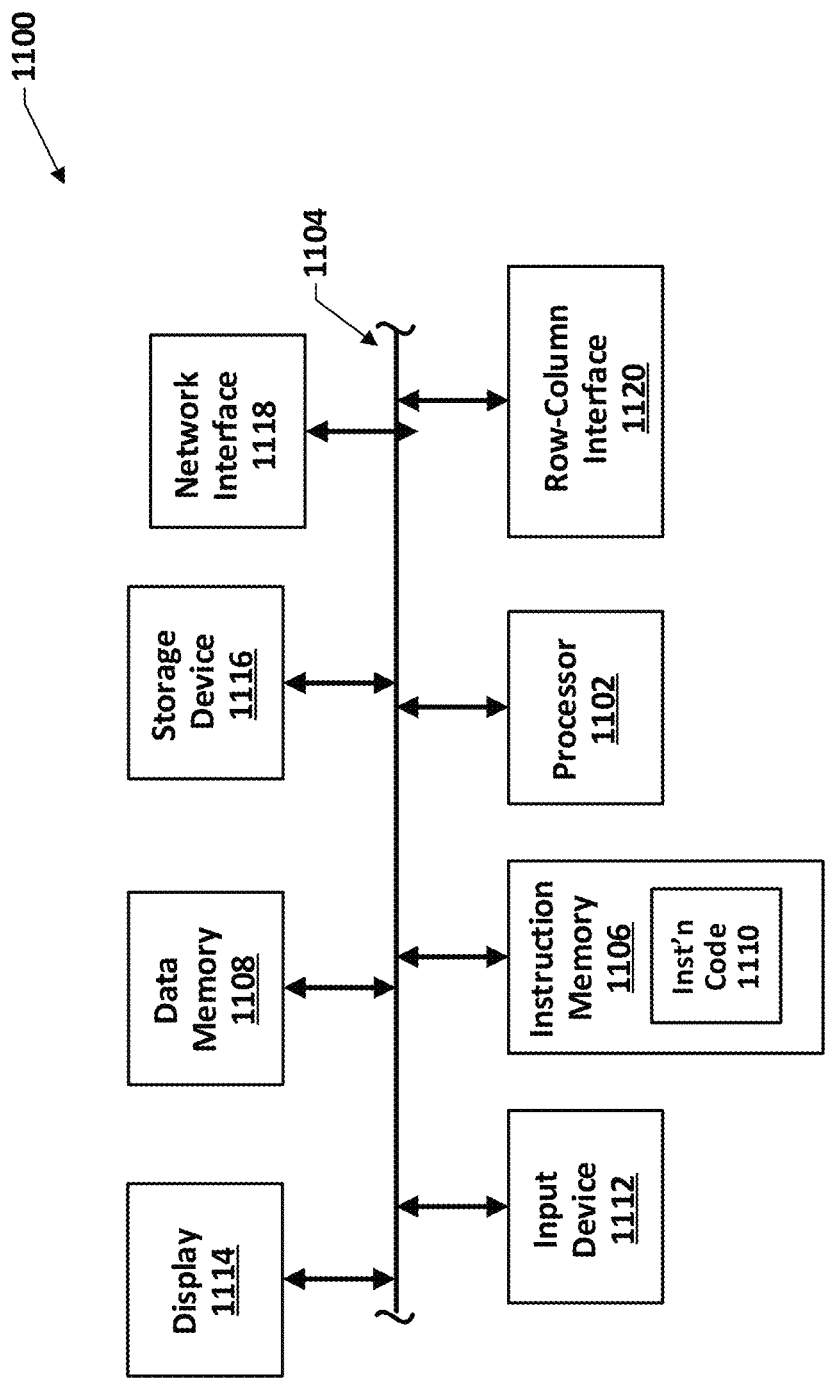
FIG. 11 shows a logic schematic of an example programmable processor device on which various example systems and methods in accordance with one more disclosed embodiments can be practiced.

FIG. 11 shows a logic schematic of an example computing system 1100 on which various example systems and methods in accordance with one more disclosed embodiments can be practiced. The computer system 1100 can include a hardware processor 1102 communicatively coupled, e.g., by a bus 1104 to an instruction memory 1106 and to a data memory 1108. The instruction memory 1106 can be configured to store, on at least a non-transitory computer readable medium as described in further detail below, executable program code 1110. The hardware processor 1102 may include multiple hardware processors and/or multiple processor cores. The hardware processor 1102 may include hardware processors from different devices, that cooperate. The computer system 1100 system may execute one or more basic instructions included in the executable program code 1110. The computer system 1100 may include a user input 1112, e.g., a keyboard, touchpad, voice-interaction resource, and may include a display 1114. The computer system 1100 may include a large capacity local storage, shown a "storage device 1116, and may include a network interface 1118. The network interface 1118 can, for example include a TCP/IP capability, and capability of intaking an Internet Service Provider (ISP). The computer system 1100 can include a row-column interface, interfacing to the row-column multiplexer, A/D converter, and switch controller described, for example, in reference to FIGS. 9A-9C A computer program product is an article of manufacture that has a computer-readable medium with executable program code that is adapted to enable a processing system to perform various operations and actions. A computer-readable medium may be transitory or non-transitory. Non-transitory computer-readable media may be understood as a storage for the executable program code. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit. Examples of on-transitory computer-readable media: include removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one, or both of the limits, ranges excluding either or both of those included limits are also included in the invention.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

We claim:

1. A method for functionalizing, into a compressible pressure varying electrical conductance device, a portion of a compressible nonwoven material (CNM) cushion, comprising:
   forming within a three-dimensional (3D) target region of the CNM cushion a columnar distribution of a non-solidified conductive polymer, extending along a column axis normal to a front surface and a back surface of the CNM cushion, the column having a first end and a second end spaced a height, in a direction toward the front surface, from the first end, the forming comprising injecting into at least a portion of the 3D target region a liquid carrying conductive polymer in suspension; and
   converting the columnar distribution of non-solidified conductive polymer into a columnar compressible pressure varying electrical conductance structure extending from the column first end to the column second end by drying or curing of the columnar distribution of the non-solidified polymer so as to at least partially cover nonwoven fibers of the CNM with a thin film of solidified conductive polymer so as to produce a functionalized area of the CNM which comprises a columnar structure that changes conductivity as empty spaces in the CNM are collapsed or expanded so as to increase or decrease connection points between portions of the solidified conductive polymer.

2. A method according to claim 1, wherein the CNM is a vertically lapped nonwoven material (VLAP), having an orientation normal to the front surface.

3. A method according to claim 1, wherein forming the distribution of non-solidified conductive polymer comprises:
   compressing the CNM occupying the 3D target region into a compressed-state CNM that occupies a portion of the 3D target region;
   injecting into the compressed state CNM the liquid carrying conductive polymer in suspension; and
   providing expansion of the compressed-state CNM out to the 3D target region, the expansion configured to distribute within and among fibers of the CNM within the 3D target region, as the columnar distribution, at least a portion of the liquid solution carrying the conductive polymer.

4. A method according to claim 3, wherein the injecting is configured to establish the column first end of the columnar distribution at a back site location on the back surface of the CNM cushion and the column second end of the columnar distribution at a front site location on the front surface of the CNM cushion.

5. A method according to claim 3, wherein the injecting is configured to establish the column first end of the columnar distribution at a back site location on the back surface of the CNM cushion and the column second end of the columnar distribution at a spacing, toward the back surface, under a front site location on the front surface of the CNM cushion.

6. A method according to claim 3, wherein the compressing, injecting, and providing expansion are mutually configured to form the columnar distribution of non-solidified conductive polymer compressible pressure indicative resistor structure as a cylindrical distribution having a nominal diameter.

7. A method according to claim 1, wherein forming the distribution of non-solidified conductive polymer and the converting are mutually configured as a multi-step iterative process, comprising:
   injecting, into the 3D target region, a first iteration portion of the liquid carrying conductive polymer in suspension, comprising axial movement of the injection tip in a configuration that distributes the injection of the first portion over a range of heights above the back surface, beginning at a starting depth below the front surface, then moving toward the front surface in a direction aligned with the columnar axis, and ending proximal to the front surface;

performing a first iteration drying, configured to fix the first distribution of the liquid carrying conductive polymer as a first distribution of not fully solidified conductive polymer;

injecting a second iteration portion of the liquid carrying conductive polymer, comprising another axial movement of the injection tip, in a configuration that distributes the injection of the second portion over a range of heights above the back surface, beginning at a second iteration starting depth below the front surface, then moving toward the front surface in a direction aligned with the columnar axis, and ending proximal to the front surface; and performing a second iteration drying, configured to at least fully dry the first distribution and second distribution to form the columnar compressible pressure varying electrical conductance structure.

8. A method according to claim 1, further comprising:
providing a front side contact, connected at the front site area to the compressible pressure indicative resistor structure, and
providing a back side contact, connected at the back site area to the compressible pressure indicative resistor structure.

9. A method according to claim 8, wherein:
providing the front side conductive contact includes depositing a front side conductive ink track on the front surface of the compressible non-woven material cushion; and
providing the back side conductive contact includes depositing a back side conductive ink track on the back surface of the compressible non-woven material cushion.

10. A method according to claim 1, wherein the pressure indicative resistor is a first pressure indicative resistor, the 3D target region is a first 3D target region, the front site area is a first front site area, the back site area is a first back site area, the compressible pressure indicative resistor structure is a first compressible pressure indicative resistor structure, and the compressible nonwoven material supported distribution of solidified conductive polymer is a first instance compressible non-woven material supported distribution of solidified conductive polymer, wherein the method further comprises:
producing a second distribution of non-solidified conductive polymer, within a second 3D target region of the non-woven material, from a second front site area on the front surface of the cushion to a second back site area on the back surface of the cushion; and
converting the second distribution of non-solidified conductive polymer in the second 3D target region of the non-woven material into a second compressible pressure indicative resistor structure, comprising drying the second distribution of non-solidified conductive polymer in the 3D target region, producing a second instance compressible nonwoven material supported distribution of solidified conductive polymer, extending from the second front site area to the second back site area.

11. A compressible nonwoven material (CNM) cushion, comprising:
at least one layer of nonwoven material having a top and bottom surface separated by a height and having length and width dimensions;
an array of columns of conductive polymer material, each column in the array extending from the top to the bottom surface of the at least one layer of nonwoven material, each column in the array being comprised of solidified conductive polymer adhered to surfaces of a plurality of individual fibers of the nonwoven material wherein the solidified conductive polymer on different individual fibers of the plurality of fibers is spaced apart from each other by different distances; and
a detection system for detecting conductivity at individual columns of the array.

12. The CNM of claim 11 configured as part of a mattress or mattress topper.

13. The CNM of claim 11 configured as part of a seat.

14. The CNM of claim 11 wherein the detection system comprises electrical connections to a top and a bottom of each column in said array.

* * * * *